May 12, 1970     R. G. KESSLER     3,511,436
EASY OPENING HEAT SEALED PACKAGE
Filed Sept. 12, 1966     2 Sheets-Sheet 1
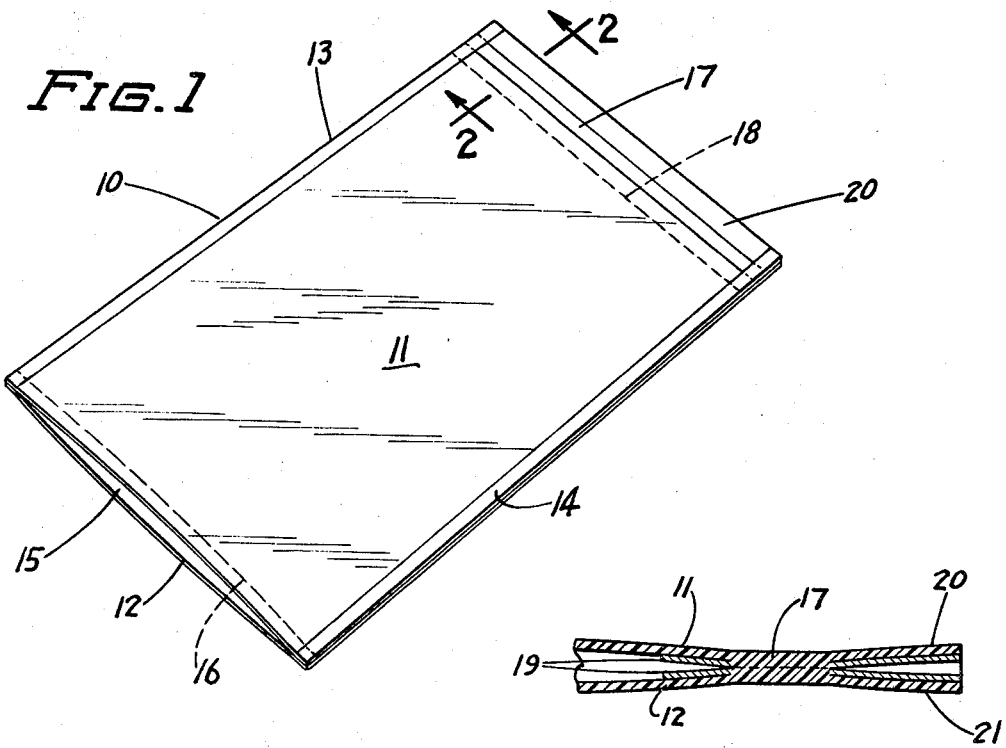
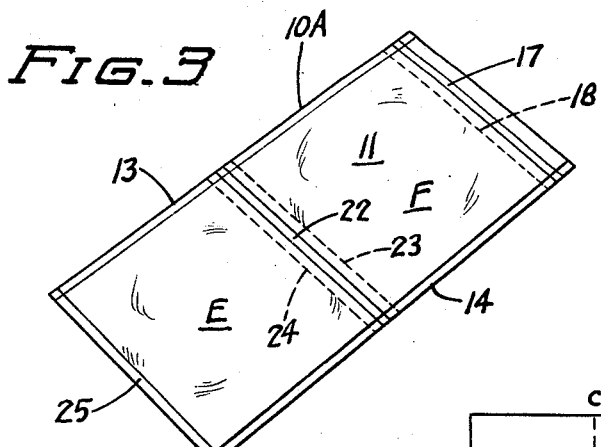
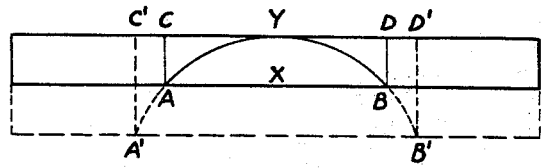
INVENTOR.
ROBERT G. KESSLER
BY
Braddock + Burd
ATTORNEYS

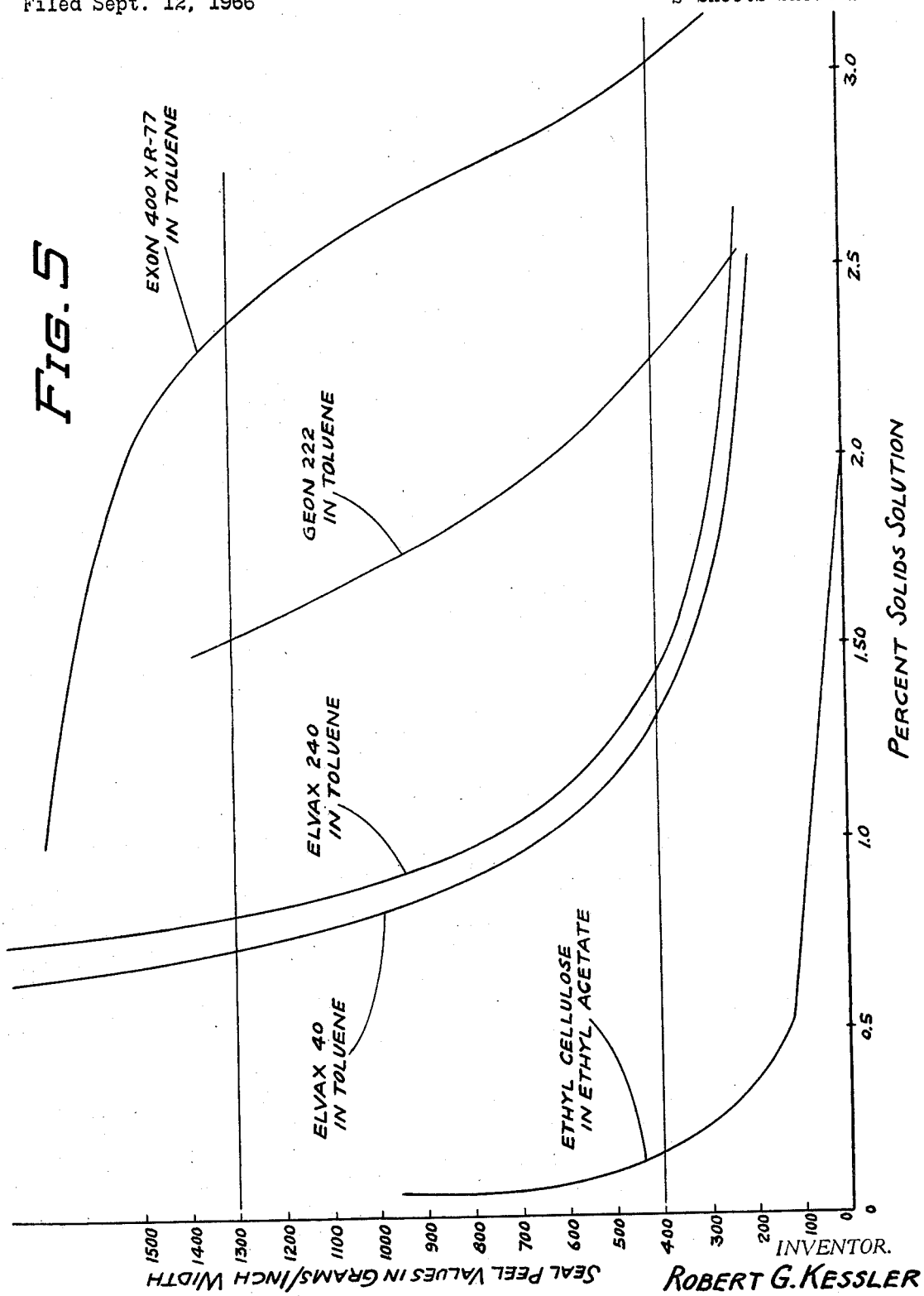

United States Patent Office 3,511,436
Patented May 12, 1970

3,511,436
EASY OPENING HEAT SEALED PACKAGE
Robert G. Kessler, New Brighton, Minn., assignor to U.S. Plywood-Champion Papers Inc., a corporation of New York
Filed Sept. 12, 1966, Ser. No. 578,786
Int. Cl. B65d 5/70, 33/22
U.S. Cl. 229—66                          9 Claims

ABSTRACT OF THE DISCLOSURE

An easy opening heat sealed pouch or envelope having at least one edge having a tight heat seal formed by bonding together two abutting surfaces under influence of heat and pressure such that the bond may be broken and the package opened easily by the use of moderate force by grasping opposite sides of the pouch between thumbs and fingers and pulling. Easy opening is achieved by interposing a coating between the heat sealable surfaces before bonding. The coating may be formed from any of a diverse group of materials including paraffin wax, ethyl cellulose, vinyl chloride-vinylidine chloride copolymer, vinyl chloride, ethylene-vinyl acetate copolymers, mineral oil, ferric chloride, liquid alkyl aryl sulfonate detergent, polyamides, polyesters, polyurethanes, acrylics, and mixtures thereof.

---

This invention relates to an easy opening pouch or envelope or similar package made from heat sealable sheet or film material. The invention also relates to sheet or film material for making such pouches, the method of making such sheet or film material susceptible to the formation of an easy opening heat seal and to the method of making such packages. For convenience the invention will be described with particular reference to so called "boil-in-bag" pouches, this being a type of package whose requirements are particularly stringent with respect to such factors as strength, integrity of seal, resistance to boiling water, resistance to dropping and the like. The invention is not limited to boil-in-bag pouches. It will be readily recognized that the easy opening heat seal feature is equally useful and adaptable to other packages subjected to less rigorous conditions in ordinary use.

The principal object of the present invention is to provide a heat sealed package in which at least one edge has a tight heat seal formed by bonding together two abutting surfaces under influence of heat and pressure such that the bond may be broken and the package opened by the use of moderate force by grasping opposite sides of the package between thumbs and fingers and pulling.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals are used to identify corresponding parts and in which:

FIG. 1 is an isometric view of one form of pouch according to the present invention;

FIG. 2 is an enlarged fragmentary section on the line 2—2 of FIG. 1 and in the direction of the arrows showing details of construction of the pouch;

FIG. 3 is an isometric view of a modified form of multi-compartment easy opened package according to the present invention;

FIG. 4 is a diagrammatic representation illustrating the forces required to develop an initial opening through a heat sealed seam; and FIG. 5 is a graphical representation showing the relationship between the concentration of selected resins employed in making easily opened heat seals and the force requirements for peeling open those seals formed in polyester-polyethylene laminated boil-in-bag pouches. This coating when subjected to heat and pressure in the sealing process becomes part of the heat sealed bond. However, it has the property of permitting the bond to be broken upon application of moderate force less than that necessary to start tearing of the flexible sheet material while otherwise maintaining a strong tight sealing bond. The heat sealed bond is desirably spaced inwardly from the edges of the sheet material to leave unsealed edge tabs which may be grasped between thumbs and fingers so that force may be exerted on the sealed edge to break the bond. Then, once the bond has been actually broken the package may be opened by exerting further force to separate the sealed bond along its length.

Reference is made to the copending application of John A. Davies filed concurrently. In that application there is disclosed and claimed an easy opening pouch in which the heat seal incorporates a coating of ethyl cellulose containing a dispersion of a metallic stearate.

Referring to the drawings, there is shown one form of pouch indicated generally at 10 and composed of a front sheet 11 and a back sheet 12. Sheets 11 and 12 are composed of heat sealable material or are provided with an adherent layer of sealable material on at least one of the abutting surfaces between them. The sheets are sealed together in the conventional manner along their opposite edges by means of heat sealed bonds 13 and 14. In the form of package illustrated, one end 15 is left to permit insertion of the material to be packaged therein, after which that end is sealed in the usual manner under heat and pressure generally in the area delineated between the broken line 16 and the end of the pouch. The opposite end is provided with an easily opened seal 17. The abutting surfaces of sheets 11 and 12 are provided with a thin uniform coating in the area delineated between the broken line 18 and the end of the pouch. This coating (FIG. 2) may be applied to either or both of the abutting heat sealable surfaces of sheets 11 and 12. If applied to both surfaces as illustrated, the coatings are thinner than if applied to one surface only. The coating 19 is desirably of a width somewhat greater than that of the heat sealed bond 17 so as to insure presence of the coating in the area of the bond without requiring maintenance of strict registration tolerances. The heat sealed bond 17 is desirably spaced inwardly from the end edge of the pouch so as to leave a pair of unsealed tabs 20 and 21 which may be readily grasped between thumbs and forefingers to initiate opening of the easily opened heat seal 17. Where such tabs are not provided the pouch may be opened by grasping the sheets 11 and 12 between thumbs and forefingers in the area spaced inwardly from the heat seal 17. If the material in the pouch is fluid and cold the pouch may be opened by squeezing the contents. Another typical form of pouch is formed by folding a web and the folded edge may be heat sealed or not as desired.

The coating 19 may be formed from a wide variety of materials, both solid and liquid, exclusive of mixtures of ethyl cellulose and zinc stearate. The material is one which is capable of being applied as thin uniform coating which is different from the material of the heat sealable surfaces to which it is applied but is adherent thereto. The material of the coating need not be compatible with the heat sealable surface in the sense that the combined substances will form a homogeneous mass. When the coating material is a solid it is usually applied from a solution or suspension. In this instance the solvent or other liquid carrier is usually driven off to leave a dry coating. The coating may be applied in line as part of a package forming operation. Some soft solid materials such as paraffin wax may be applied by friction and abrasion by passing a web of sealable material in contact with a solid block of the coating material. When applied in liquid form, printing or coating rollers, or spray or atomizing devices are ordinarily employed. The coating is normally applied as an extremely thin layer such that no doctoring or other excess removal means need be employed. When used in production of food packages the coating must be non-toxic.

Regardless of the particular material used, the coating enters into and becomes an integral part of the heat seal bond. The coating, however, has the property of permitting the bond to be broken and the seal to be peeled open upon aplication of moderate force. This force must be less than that necessary to start tearing of the flexible sheet material from which the package is formed. However, because boiling tends to weaken the strength of the bond, in the case of boil-in-bag pouches the seal may have an initial peel value greater than the tear strength of the sheet material and after boiling peel very easily without tearing. Except when the peeling force is applied, a strong tight sealing bond must be maintained to protect the contents of the package. The strength of the seal is dependent to large extent upon the amount of coating applied to the surfaces before heat sealing. This varies widely depending upon the particular coating material used. When using any one particular coating material, the amount required to produce a tight but easily peelable seal varies depending upon the state of oxidation of the heat sealable surface. Where the sealable surface is polyethylene which has been corona treated to raise the level of oxidation a lower coating weight may be used and still be effective. The amount of force required to peel open the seal varies widely depending upon the nature of the material packaged and the conditions to which the package is ordinarily subjected.

A standardized test procedure for measuring this force has been established, based upon a heat seal ⅜ inch wide and 1 inch long. The amount of force necessary to peel open this seal is measured. For a peel-open package containing adhesive bandage strips which are light in weight and ordinarily gently handled, a force of 35 grams as measured on a Suter tensile tester has been found to be appropriate. Similarly, materials such as potato chips, snack foods and the like which by their fragile nature require gentle handling may be packaged with easy opening seals which may be peeled with minimum force of about the same order of magnitude. On the other hand, boil-in-bag pouches are subjected to more rigorous handling. The pouches are subjected to boiling water for long periods of time. Because they are hot when removed from the boiling water there is an ever present danger of being dropped. For this purpose a force of from about 400 to 1300 grams per inch of ⅜ seal measured before boiling has been found appropriate.

Because of the higher requirements for boil-in-bag pouches, the invention is illustrated with particular references to these packages as demonstrating the achievement of a strong tight but easy opening seal which will stand up under stringent conditions of handling and use. While the forces are expressed with reference to a ⅜ inch wide seal it will be understood that functional peel levels vary with seal width. Narrower seals tolerate stronger peel strength while wider seals require lower peel strength to insure the maintenance of a strong tight seal which may be easily opened. In all instances the force necessary to start tearing of the material from which the package is formed establishes a maximum which cannot be exceeded.

In FIG. 5 there are plotted the seal strengths or peel values for several different resinous coating materials used at varying concentrations for the production of easy opening heat seals. In each instance the samples were coated by drawing down with a #4 RDS wire wound rod (R.D. Specialties) on the polyethylene side of polyester-polyethylene film and all seals were made at 400° F. at 40 p.s.i. for 0.5 second. It can readily be determined at which concentration a given coating material will produce an easy opening heat seal having a particular desired peel value. The desirable peel value limits for boil-in-bag pouches are those lying between the lines representing 400 and 1300 grams.

While the manner in which the coating functions to permit formation of an easily opened heat seal is not fully understood, and while applicant does not desire to be bound by any particular theory, the following explanation is offered. The controlling factor in heat seal strength of polyethylene is believed to be the concentration of

configuration available to the polyethylene surfaces at the heat seal interface. Assuming uniform coating levels, materials having high concentration of the

or multiples thereof will contribute to high seal values. As the concentration of the

configuration lowers, or as the chain length shortens, seal values will be lower. A material with no

groups may still be functional if applied at a low enough coating weight so as to allow polyethylene of one interface to contact reduced areas of

groupings of polyethylene in the other.

The critical factor in the easily opened seal is the force required to develop the initial opening through the seal. This is illustrated diagrammatically in FIG. 4, to which reference is now made. Once an opening is developed through the area X along the arc AYB the remainder of the seal is easily opened because force is then applied only against the sections AC and BD. As the seal width is increased, as shown in broken lines, the length of the arc A'YB' also increases and the total force necessary to separate the sealed surfaces along that arc increases proportionately. Thus seal width dictates appropriate peel strength level. As stronger seals are usually more reliable, narrow seals are generally preferred.

A modified two compartment pouch is shown in FIG. 3. The general construction of this pouch is as already described. Sheets 11 and 12 are heat sealed together along their opposite edges by bond 13 and 14. An easy opening heat sealed bond 17 at one end of the bag is provided by virtue of the coating at the interface, delineated by line 18. A further heat sealed bond 22 is provided across the middle of the pouch as illustrated, this seal also being easily opened by virtue of a coating at the interface, delineated between lines 23 and 24. The opposite end of the bag is heat sealed along seam 25 in the usual manner. This now provides a multiple compartment pouch useful for the packaging of two component systems, such as epoxy adhesives and the like. For example, one component is packaged in compartment E and the other, such as the catalyst, is packaged in compartment F. Then, prior to use, seal 22 is broken by squeezing of compartment E and the material from that compartment is forced into and intermingled with the ingredients in compartment F. During the mixing operation care must of course be taken to avoid opening seal 17. Then, when the components are thoroughly mixed, seal 17 is opened either by pressure on the packaged materials or by force applied to the unsealed edges adjacent seal 17.

Instead of providing an easy opening seal at one end of the package, the package may be conventionally closed along all edges and provided with an easy opening seal only as a divider to separate the package into compartments. In this manner accidental opening of a multi-compartmented package during mixing of multi-component systems may be avoided.

Instead of providing an easy opening seal across the entire width of one end of the package (either single or multi-compartmented) the easy opening heat seal may be disposed diagonally across one corner. To protect the easy opening seal from accidental opening the corner tab may then be folded over and taped or otherwise fastened to the outside of one of the side walls of the package. When the corner easy opening seal is opened, pouring of the contents of the package is facilitated by the corner opening.

Among coating materials which may be used in the practice of the present invention are such diverse substances as paraffin wax; ethyl cellulose; vinyl chloride-vinylidene chloride copolymer (Geon 222); vinyl chloride containing about 7% carboxyl (Exon 400 XR–77); ethylene-vinyl acetate copolymers, including ethylene-vinyl acetate copolymer containing about 28% vinyl acetate (Elvax 240) and ethylene-vinyl acetate copolymer containing about 40% vinyl acetate (Elvax 40); mineral oil; ferric chloride; liquid alkyl aryl sulfonate detergent; polyamides (Scope 31); polyesters (Scope 51); polyurethanes (Estane 5703, F–2); acrylics (Neocryl B–731); and various mixtures thereof. These diverse materials have been selected at random to illustrate the broad scope of the invention.

The invention is illustrated with particular reference to polyethylene-polyester (Mylar) flexible sheet material widely used in the manufacture of boil-in-bag pouches and other heat sealable packages. Other heat sealable film substrates may be used including polyethylene alone; polyethylene coated on or laminated to paper, cellophane, aluminum foil or nylon; and the like.

The invention is further illustrated by the following examples:

EXAMPLES 1–41

A large number of heat seals were made using a variety of coating materials and solvents and uniform sealing conditions of 400° F. at 40 p.s.i. for a dwell time of 0.5 second on a Sentinel sealer. The substrate in each instance was standard boil-in-bag pouch material (50 gauge type A Mylar—2 mil medium density polyethylene). The coating was applied in some instances with a pilot plant coating machine using a 1 inch wide rotogravure wheel. In other instances the coating was manually applied in the laboratory by drawdown technique using a #4 RDS wire wound rod. The coating was applied to the polyethylene surface and dried before sealing one coated face to one uncoated but normally heat sealable polyethylene face. A series of 1 inch wide segments of the seal were cut from the sealed assembly. The free unsealed ends of these segments were clamped into the jaws of a Suter tensile tester. The normal stops on the pendulum are raised to allow the pendulum to give a continuous reading of seal value even though it may alternate to high and then to low values. The lower jaw of the tester is adjusted to a jaw separation speed of 12 inches per minute. The tester is then started and the seal value is taken as the visual average of the pendulum swing as read on the scale. The peel value is reported as the average of a number of samples, usually five. The results are as follows:

| Ex. No. | Coating material | Solvent | Solids (percent) | Average peel value (grams) |
|---|---|---|---|---|
| 1 | Ethyl cellulose | Ethyl acetate | 1.0 | 86 |
| 2 | do | do | 0.5 | 96 |
| 3 | do | do | 0.25 | 325 |
| 4 | do | do | 0.125 | 509 |
| 5 | do | do | 0.0625 | 963 |
| 6 | Elvax 240 | Toluene | 5.0 | 1,278 |
| 7 | do | do | 5.0 | 2,365 |
| 8 | do | do | 2.5 | 1,217 |
| 9 | do | do | 2.5 | 2,312 |
| 10 | do | do | 2.0 | 285 |
| 11 | do | do | 1.25 | 416 |
| 12 | do | do | 1.25 | 2,779 |
| 13 | do | do | 1.25 | 2,550 |
| 14 | do | do | 1.0 | 762 |
| 15 | do | do | 0.75 | 825 |
| 16 | do | Heptane | 2.50 | 252 |
| 17 | do | do | 2.25 | 299 |
| 18 | do | do | 2.0 | 255 |
| 19 | do | do | 1.75 | 434 |
| 20 | do | do | 1.60 | 591 |
| 21 | do | do | 1.50 | 596 |
| 22 | do | do | 1.25 | 523 |
| 23 | Exon 400 XR-77 | Toluene | 3.50 | 145 |
| 24 | do | do | 3.25 | 174 |
| 25 | do | do | 3.0 | 662 |
| 26 | do | do | 2.75 | 777 |
| 27 | do | do | 2.0 | 1,456 |
| 28 | Geon 222 | do | 2.5 | 226 |
| 29 | do | do | 2.0 | 611 |
| 30 | do | do | 1.5 | 1,333 |
| 31 | Elvax 40 | do | 2.5 | 198 |
| 32 | do | do | 2.0 | 279 |
| 33 | do | do | 1.75 | 283 |
| 34 | Equal parts Elvax 40 Exon 400 XR-77 and Geon 222. | do | 2.5 | 159 |
| 35 | do | do | 2.25 | 358 |
| 36 | do | do | 2.0 | 545 |
| 37 | do | do | 1.75 | 717 |
| 38 | do | do | 1.50 | 758 |
| 39 | Ferric chloride | Methyl ethyl ketone. | 5.0 | 88 |
| 40 | do | do | 4.5 | 1,420 |
| 41 | do | do | 4.0 | 2,160 |

[1] Laboratory.
[2] Machine.

EXAMPLES 42–69

In order to evaluate the effect of variations in sealing conditions on formation of easy opening seals, a further series of tests were conducted utilizing a variety of sealing temperatures, times and pressures. In each instance the coating material was a 1.6% solution of Elvax 240 in heptane. In some instances, as noted, a double seal was made composed of two impressions on the same spot. The substrate and test procedure were as described in connection with Examples 1–41. The results of these tests were as follows:

SEALING CONDITIONS

| Example No. | Temp. (° F.) | Pressure (p.s.i.) | Time (seconds) | Average peel value (grams) |
|---|---|---|---|---|
| 42 | 290 | 40 | 0.5 | 6 |
| 43 | 290 | 40 | 0.5 | 1,450 |
| 44 | 290 | 40 | 1.0 | 124 |
| 45 | 290 | 40 | 1.5 | 273 |
| 46 | 290 | 50 | 1.0 | 391 |
| 47 | 290 | 60 | 1.0 | 503 |
| 48 | 325 | 40 | 0.5 | 333 |
| 49 | 325 | 40 | 0.5 | 1,637 |
| 50 | 325 | 40 | 1.0 | 473 |
| 51 | 325 | 40 | 1.5 | 508 |
| 52 | 350 | 10 | 1.0 | 505 |
| 53 | 350 | 20 | 1.0 | 505 |
| 54 | 350 | 30 | 1.0 | 361 |
| 55 | 350 | 40 | 0.5 | 388 |
| 56 | 350 | 40 | 0.5 | 1,700 |
| 57 | 350 | 40 | 1.0 | 639 |
| 58 | 350 | 40 | 1.5 | 619 |
| 59 | 350 | 50 | 1.0 | 570 |
| 60 | 350 | 60 | 1.0 | 579 |
| 61 | 375 | 40 | 0.5 | 608 |
| 62 | 375 | 40 | 1.0 | 691 |
| 63 | 400 | 10 | 1.0 | 1,032 |
| 64 | 400 | 20 | 1.0 | 890 |
| 65 | 400 | 30 | 1.0 | 1,466 |
| 66 | 400 | 40 | 0.5 | 591 |
| 67 | 400 | 40 | 1.0 | 1,250 |
| 68 | 400 | 50 | 1.0 | 1,095 |
| 69 | 400 | 60 | 1.0 | 1,555 |

[1] Double seal.

EXAMPLES 70–84

Further evaluation of the effect of variation in sealing conditions was made in a series of tests utilizing a 1.25% solution of Elvax 240 in toluene as the coating material.

The substrate and coating and testing procedures were as described in connection with Examples 1–41. The results were as follows:

SEALING CONDITIONS

| Example No. | Temp. (° F.) | Pressure (p.s.i.) | Time (seconds) | Average peel value (grams) |
|---|---|---|---|---|
| 70 | 290 | 10 | 1.0 | 202 |
| 71 | 290 | 40 | 1.0 | 155 |
| 72 | 290 | 60 | 1.0 | 152 |
| 73 | 350 | 10 | 1.0 | 370 |
| 74 | 350 | 40 | 1.0 | 609 |
| 75 | 350 | 60 | 1.0 | 768 |
| 76 | 400 | 10 | 1.0 | [1] 651 |
| 77 | 400 | 10 | 1.0 | [2] 775 |
| 78 | 400 | 20 | 1.0 | 713 |
| 79 | 400 | 30 | 1.0 | [1] 674 |
| 80 | 400 | 30 | 1.0 | [2] 674 |
| 81 | 400 | 40 | 0.5 | [1] 779 |
| 82 | 400 | 40 | 1.0 | 603 |
| 83 | 400 | 50 | 1.0 | 650 |
| 84 | 400 | 60 | 1.0 | 662 |

[1] Machine run.
[2] Laboratory run.

EXAMPLE 85

A preferred formulation is made up of 70% Elvax 240 and 30% Exon 400 XR-77 dissolved in toluene. This formulation has been found to produce good easy open seals when applied at concentrations from about 7/16 to 1¾% solids to Mylar/polyethylene pouch stock. Lesser concentrations are used if the polyethylene surface has been pretreated by corona discharge or other exoidation treatment.

EXAMPLE 86

Paraffin solutions in toluene in concentrations of 2½, 5 and 10% were applied with #4 and #8 wire wound rods to standard Mylar/polyethylene boil-in-bag stock, on the polyethylene side. Each of these coated sheets was heat sealed to a similar uncoated sheet, to the polyethylene side. Although conditions of sealing are more critical with this material, seals with useful peel values were obtained. Most consistent results were obtained at 300° F. and 40 p.s.i. for 0.5 second.

PHYSICAL TESTS

A number of physical tests have been devised to test the effectiveness of the easy open seal against accidental opening under a variety of severe conditions. To determine the effect of hot water on the easy open heat seal the filled pouch is immersed in boiling water and left for one hour. Then, this boiled pouch is dropped from a height of about 3 feet onto a hard floor or similar surface. The pouch is dropped variously on the easy open heat sealed end, on the bottom, or on one of the conventionally heat sealed side seams. To determine the effect of freezing, the pouch is filled with water or with a food substance such as chili and placed in a freezer until frozen solid. These pouches are then subjected to drop tests while still frozen and are then boiled for one hour and then dropped. Hundreds of pouches provided with easy open heat seals according to the present invention have been subjected to one or more of these physical tests and have been found to survive these rigorous conditions without failure of the pouch while retaining the easy opening seal feature. It will be recognized that the conditions of these tests are far in excess of those likely to be encountered in ordinary usage. The results of selected tests are shown below:

(A) A number of pouches were made generally according to Example 22. The pouches were made from polyethylene coated Mylar approximately 6¼ by 8½ inches. The easy peel seal included a coating of 1¼% Elvax 240 in toluene applied from an engraved roller on a pilot plant machine. The pouches were vacuum packed with chili and sealed at 400° F. at 40 p.s.i. for 0.5 second and then boiled for one hour. Of eight pouches, one broke through the easy peel seal on the second drop. Another broke through the easy peel seal on the fourth drop. A third broke through a side seam on the fourth drop. A fourth broke through the easy peel seal on the seventh drop. A fifth broke through the top seam on the tenth drop. The other three pouches took ten drops with no breakage. Each of the pouches opened easily at the easy peel seal.

(B) Similar pouches were made on a Simplex machine using the coating formulation of Example 22 but with a sealing temperature of 340° F. The pouches are produced at the rate of 30 per minute. The easy peel seal was ⅜ inch wide. Four of these pouches filled with chili were boiled and then subjected to the drop test. One broke through the bottom seam on the second drop but the easy opening top seal opened easily and did not tear. The top seam of another broke on the fourth drop. The bottom seam on the third broke on the tenth drop. The last took ten drops with no breakage. In each instance the easy opening seal was effective.

(C) Of four pouches made according to Example 19, filled with chili and boiled for one hour, one broke on the side seam on the seventh drop. Another broke on the ninth drop. Two others took ten drops with no breakage. The tops opened easily.

(D) Eight pouches according to Example 66 were filled with chili boiled for one hour and subjected to the drop test. Two broke on the second drop in the side of the pouch below the easy open seal. One broke in the side of the pouch on the third drop and another on the fifth. One broke in the side seam on the fifth drop. One broke in the side seam on the tenth drop. One took ten drops upside down on the easy open seal without breakage. Another took eight drops upside down on the easy open seal followed by six drops on the bottom with no breakage. In each instance the tops opened easily.

(E) Two pouches made according to Example 15, filled with salt water and boiled for one hour were subjected to the drop test. The first broke along the side seam on the fourth drop. The other took ten drops with no breakage.

(F) Two pouches made according to Example 14, filled with salt water and boiled for one hour were dropped. The first began delaminating in the easy open seal area on the third drop. The other took ten drops with no breakage.

(G) Two pouches made according to Example 11 were filled with salt water and boiled for one hour and then dropped. One broke along the side seam on the seventh drop. The other took ten drops with no breakage.

EXAMPLES 87–99

To further illustrate the broad scope of coating materials which may be used effectively to produce easily opened heat seals, other resinous materials were used including Scope 31 (a polyamide resin from Johnson Wax Company); Estane 5703, F-2 (a polyurethane from B. F. Goodrich); Neocryl B-731 (an acrylic copolymer from Polyvinyl Chemicals, Inc.) and Scope 51 (a polyester from Johnson Wax). These materials were applied as coatings to polyester/polyethylene boil-in-bag pouch stock and heat seals were made generally as previously described. The peel values were measured for various concentrations of resin. The results were as follows:

| Ex. No. | Coating material | Solvent | Solids (percent) | Average peel value (grams) |
|---|---|---|---|---|
| 87 | Scope 31 | 50/50 isopropyl alcohol/toluene | 3.0 | 1,533 |
| 88 | do | do | 3.5 | 796 |
| 89 | do | do | 4.0 | 319 |
| 90 | Estane 5703 F-2 | 50/50 methyl ethyl ketone/toluene | 4.0 | 354 |
| 91 | do | do | 3.0 | 540 |
| 92 | do | do | 2.5 | 1,202 |
| 93 | Neocryl B-731 | Toluene | 2.0 | 141 |
| 94 | do | do | 1.5 | 1,153 |
| 95 | Scope 51 | 50/50 methyl ethyl ketone/toluene | 10.0 | 74 |
| 96 | do | do | 7.5 | 222 |
| 97 | do | do | 5.0 | 584 |
| 98 | do | do | 4.5 | 851 |
| 99 | do | do | 4.0 | 2,150 |

I claim:
1. An easy opening heat sealed package having at least one easily opened seal:
   (A) said package composed at least in part of flexible sheet material having two abutting heat sealable surfaces joined together in a relatively narrow heat sealed bond;
   (B) at least one of said abutting heat sealable surfaces having thereon, over at least the area of said heat sealed bond, a thin uniform coating of a material other than a mixture of ethyl cellulose and a metallic stearate, said coating material being dispersible in a liquid for application and comprised of at least one material selected from the group consisting of paraffin wax, ethyl cellulose, vinyl chloride-vinylidine chloride copolymer, vinyl chloride, ethylene-vinyl acetate copolymers, mineral oil, ferric chloride, liquid alkyl aryl sulfonate detergent, polyamides, polyesters, polyurethanes and acrylics, said coating being different from the material of said heat sealable surfaces but adherent thereto;
   (C) said coating composing part of said heat sealed bond; and
   (D) said coating serving as means for permitting the bond to be broken by application of moderate force less than that necessary to start tearing of the flexible sheet material while otherwise maintaining a strong tight sealing bond.

2. An easy opening heat sealed package according to claim 1 further characterized in that said heat sealed bond is spaced inwardly from the edges of said sheet material to permit grasping of said edges between thumbs and fingers to exert force to break said bond.

3. An easy opening heat sealed package according to claim 1 further characterized in that said coating is a dry solid material.

4. An easy opening heat sealed package according to claim 1 further characterized in that said heat sealable surfaces are polyethylene.

5. An easy opening package according to claim 1 further characterized in that:
   (A) said package is a boil-in-bag pouch for packaging and heating food products;
   (B) said flexible sheet material having heat sealable surfaces is a high tensile strength polyester film having polyethylene laminated thereto, and
   (C) said coating is applied to the polyethylene surface.

6. An easy opening package according to claim 1 further characterized in that said heat sealed bond has a strength such that a ⅜ inch wide sealed bond requires application of a force of about 35 to 1300 grams per inch to break the bond.

7. An easy opening package according to claim 5 further characterized in that said heat sealed bond has a strength such that a ⅜ inch wide sealed bond requires application of a force of about 400 to 1300 grams per inch to break the bond and said pouch filled with hot liquid may be dropped from a height of about 30 inches without rupturing.

8. An easy opening package according to claim 7 further characterized in that said coating is an ethylene-vinyl acetate co-polymer containing about 28 percent vinyl acetate.

9. An easy opening package according to claim 7 further characterized in that said coating is a mixture of about 70% of an ethylene-vinyl acetate co-polymer containing about 28 percent vinyl acetate and about 30% of a vinyl chloride polymer containing about 7 percent carboxyl.

References Cited
UNITED STATES PATENTS
3,278,109  10/1966  Salway _____ 229—62

DAVID M. BOCKENEK, Primary Examiner

U.S. Cl. X.R.
229—51, 62

PO-1050
(5/69)

UNITED STATES PATENT OFFICE
CERTIFICATE OF CORRECTION

Patent No. 3,511,436          Dated   May 12, 1970

Inventor(s)    Robert G. Kessler

It is certified that error appears in the above-identified patent and that said Letters Patent are hereby corrected as shown below:

Column 6, Example No. 52, under Average peel value (grams) "505" should be  -403--

Column 7, line 28, "exoidation" should be  --oxidation--

NOV. 3, 1970

(SEAL)
Attest:

Edward M. Fletcher, Jr.
Attesting Officer

WILLIAM E. SCHUYLER, JR.
Commissioner of Patents